Feb. 7, 1961 H. J. McCREARY 2,971,182

KEY SENDERS

Filed July 13, 1955 4 Sheets-Sheet 1

INVENTOR.

HAROLD J. Mc CREARY

BY Mc Walter Owen

ATTY.

Feb. 7, 1961 H. J. McCREARY 2,971,182
KEY SENDERS
Filed July 13, 1955 4 Sheets-Sheet 2

INVENTOR.
HAROLD J. McCREARY
BY Wm. Walter Owen
ATTY.

Feb. 7, 1961
H. J. McCREARY
2,971,182
KEY SENDERS
Filed July 13, 1955
4 Sheets-Sheet 3

INVENTOR.
HAROLD J. McCREARY
BY Wm Walter Owen.
ATTY.

Feb. 7, 1961

H. J. McCREARY 2,971,182

KEY SENDERS

Filed July 13, 1955

4 Sheets-Sheet 4

INVENTOR.
HAROLD J. McCREARY

BY Wm Watts Owen,

ATTY.

Patented Feb. 7, 1961

2,971,182

KEY SENDERS

Harold J. McCreary, Lombard, Ill., assignor to Automatic Electric Laboratories, Inc., a corporation of Delaware Filed July 13, 1955, Ser. No. 521,689

26 Claims. (Cl. 340—174.1)

Figure 1:
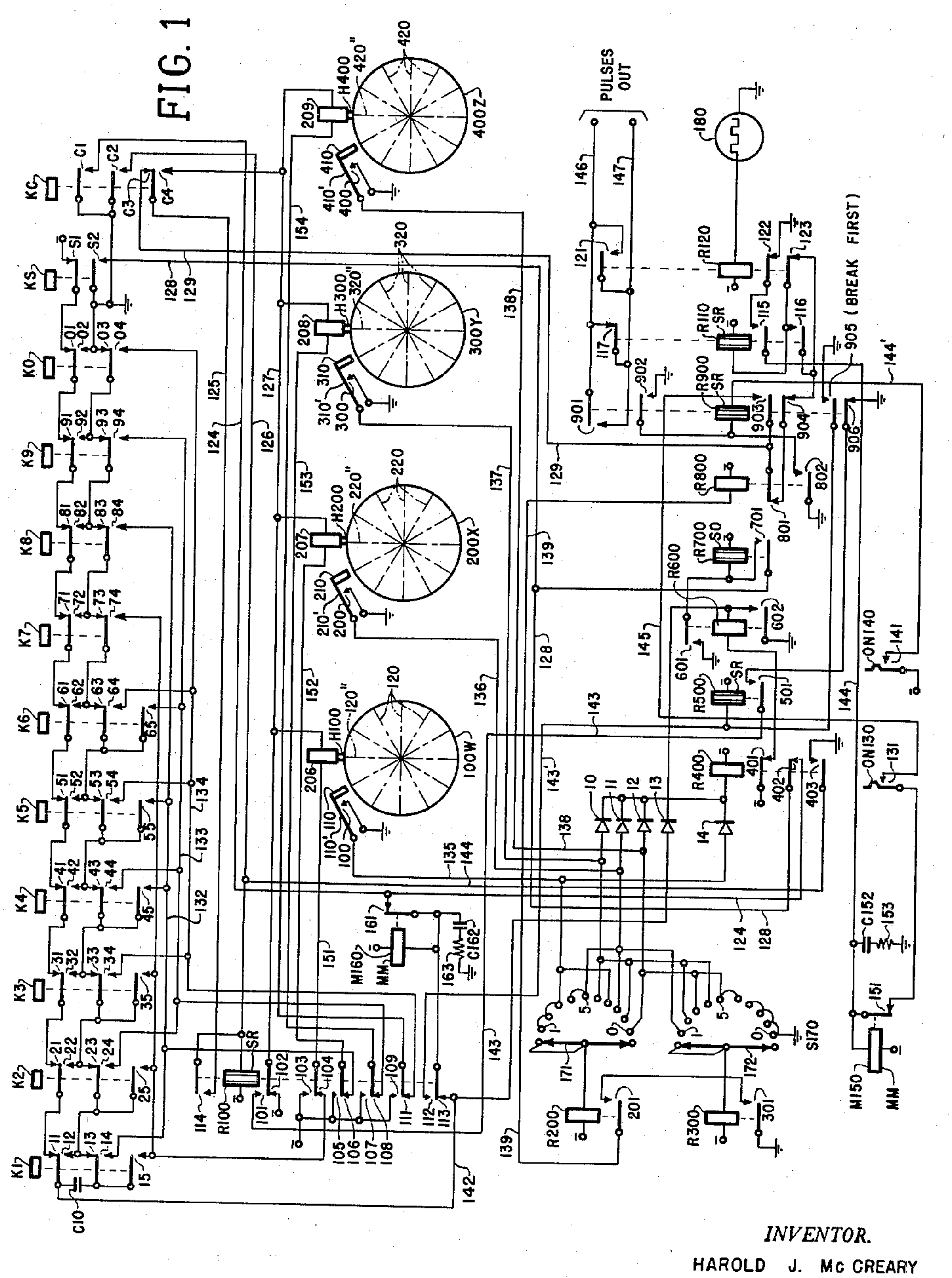

This invention relates in general to arrangements for magnetically storing information and for reading out the information stored after any selected time lapse by means of apparatus operated responsive to the magnetically stored information. More particularly, this invention relates to new and novel improvements in magnetic memory systems in which information stored therein in the form of localized magnetizations may be read out by means of apparatus mechanically responsive to said magnetizations.

I have shown my improved memory apparatus in connection with a key sender for registering and storing information in coded form therein and novel means for reading out the stored information, translating the same, and transmitting the information as digital impulses.

Memory systems of the character employing the well-known expedient of magnetizing patterns of localized magnetic "spots" or markings on a magnetizable medium in general utilize such spots to induce a voltage in a winding in a read-out coil, the core of which is closely associated with the medium. Thus, as relative movement is effected between the core and the medium a pattern in time of induced voltages corresponding to the pattern of magnetizations on the medium is generated and the intelligence represented by the pattern of magnetization is transferred to the pattern of induced voltages. The magnitude of the voltages so induced, however, being dependent upon factors such as the rate of the relative movement, the density and distribution of the magnetic flux in the "spot," coil and core constants, etc., is of a relatively low order, therefore necessitating the introduction of specialized amplifier apparatus before the induced voltages can be effectively utilized. The rate, and uniformity of relative movement between the magnetic medium and the core of the read-out coil necessary to produce a satisfactory induced voltage also imposes a burden upon the circuits and apparatus which to some degree limits the application of such magnetic memory systems where ruggedness and reliability rather than extremely high speed are prerequisites.

In a key sender of the character contemplated by the present invention, for example, where a series of digits representing a called subscriber telephone directory number is manually keyed by an operator, each of the digits is translated into a coded marking represented by a pattern of magnetizations on the magnetic medium. The coded markings are reserved until such time as the entire series of digits of the called subscriber directory number have been keyed, at which time the sender may be controlled to read out from the magnetic medium the coded markings and retranslate the markings into periodic control of an impulsing circuit. Each of the digits keyed into the sender is then ultimately transmitted as a predetermined series of periodic impulses which then may be used to control conventional telephone switching apparatus in a well-known manner. Obviously in such a system having an output requirement of the order of ten impulses per second and an input limited by the dexterity of the operator, high speed read out, such as within an interval of 16 micro-seconds, as is the case in one well-known magnetic memory, is uncalled for. The use of such known systems required more complex arrangements in a transmitting system of the character contemplated than is necessary with the present memory system.

Accordingly, it is the primary object of this invention to provide a new and improved impulse transmitting arrangement including a novel memory, which memory is adapted to simply and positively store coded markings representing predetermined digits within the limits of relatively moderate speed requirements.

Another object of this invention is to provide in a key sender apparatus a new and improved memory arrangement implemented entirely by means of electromagnetic and mechanical switching media thereby resulting in a substantial simplification over comparable known memory devices with a consequent high degree of reliability.

A further object of this invention is the provision in a key sender apparatus of new and improved circuit arrangements and organization including a new and novel magnetic memory means in which stored magnetizations are utilized to sequentially operate switching means at rates of operation within the limits of the key sender operation speeds.

Still another object of this invention is the provision of a key sender apparatus including a new and improved means for registering digits representing called subscriber directory telephone numbers keyed into the said key sender apparatus and reserving such digits until all of the digits of the number are so keyed whereupon said digits are translated into corresponding digital impulses and transmitted.

A still further object of this invention is to provide for use in a key sender apparatus a new and novel memory means comprising a magnetic storage medium in turn made up of a plurality of radially disposed magnetizable elements, which elements when momentarily magnetized in a predetermined sequence are operable to control associated contact springs in a corresponding predetermined sequence.

Other objects and features together with those of the above will become evident from the detailed description of the present invention herein. The said objects and features are realized generally in an apparatus according to this invention in which a series of digital keys are provided, the operation of any one of which will cause its corresponding digit to be entered into the sender. The particular digit entered or keyed in will then be recorded on a magnetic storage medium in the form of a predetermined pattern or code of localized magnetizations. All of the digits of a desired number are keyed and recorded in this manner and when the keying operation has been completed, operation of additional control means will cause the digit markings as represented by the magnetizations of the storage medium to be "read out." This "reading out" operation is accomplished by means of armatures which are adapted to be momentarily attracted to each of the said magnetizations as relative movement is effected between the storage medium and the armatures. The armatures in turn control well known contact springs so that as the armatures are sequentially operated by reason of the magnetizations moving in relation to the armatures, the contact springs may be employed to periodically control associated circuits in correspondence with the said pattern of magnetizations, and therefore, in correspondence with the digits keyed into the sender. An impulse generating means is then controlled by said associated circuits such that said code or pattern of digit markings recorded in the storage medium will be retranslated into a series of digital impulses corresponding to the number originally keyed into the sender apparatus.

Figure 2:
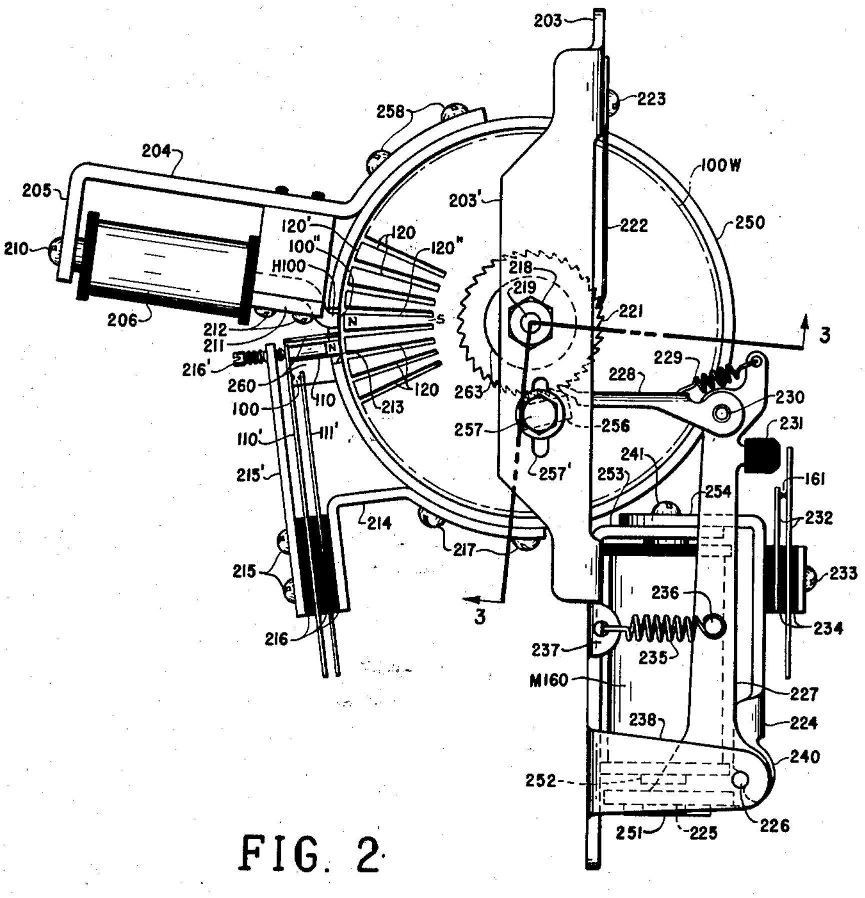
Figure 3:
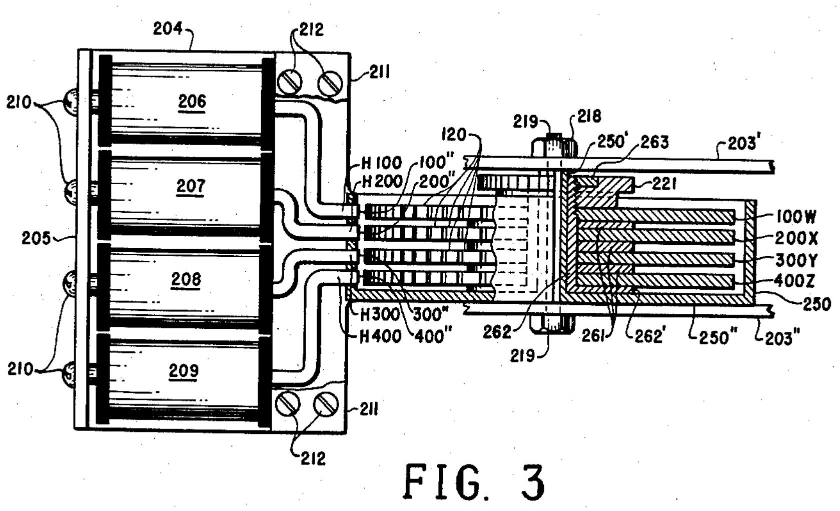
Figure 4:
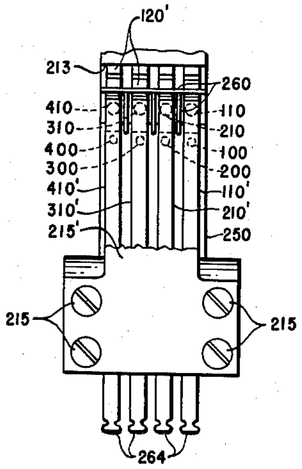
Figure 5:
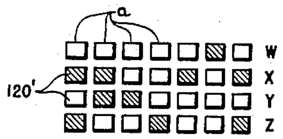
Figure 6:
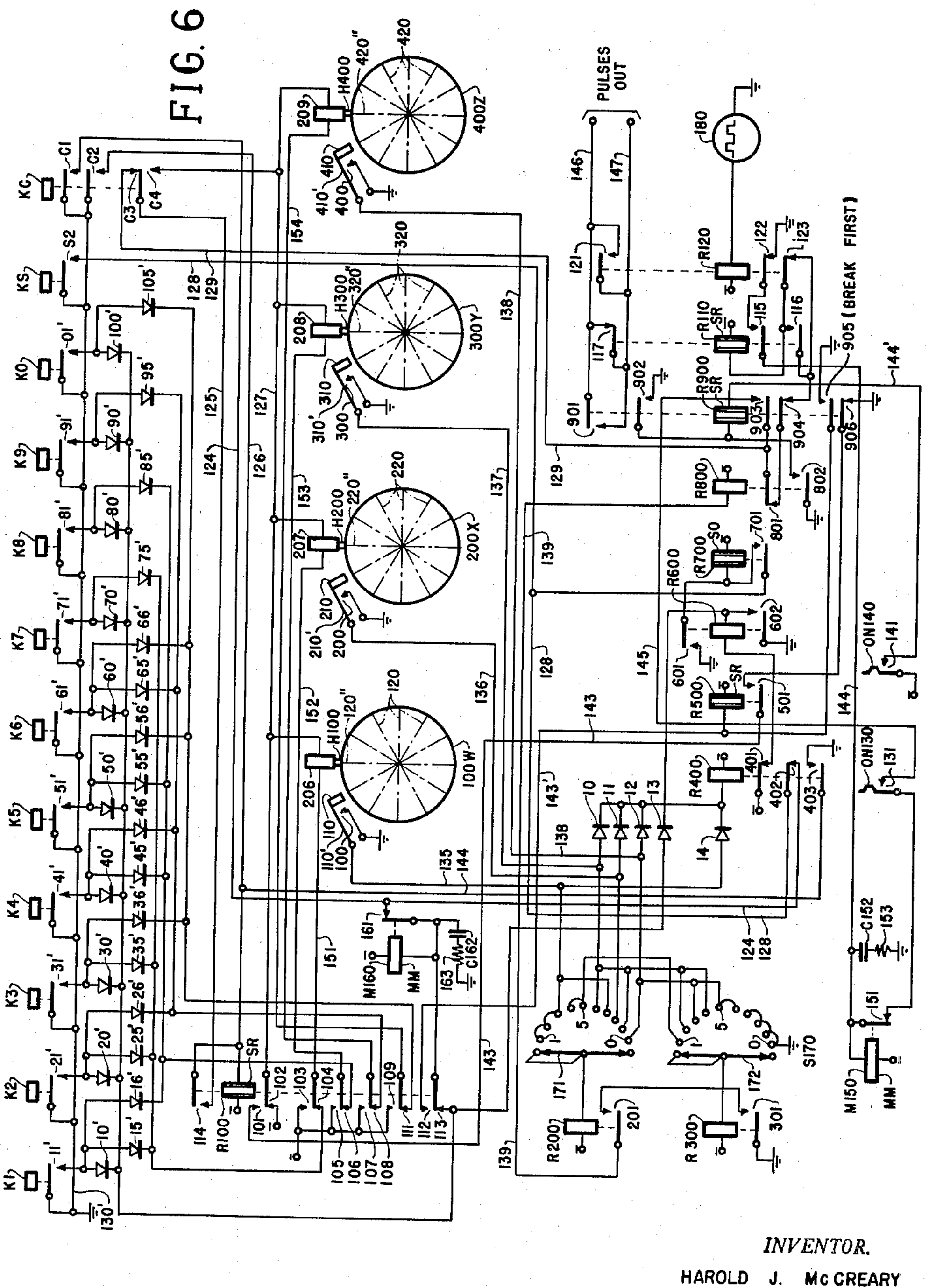

This invention with respect to its organization and manner of operation together with the advantages pertaining thereto will be best understood from the detailed description which follows, with reference to the accompanying drawings, in which:

Fig. 1 shows a schematic representation of the circuits and components of the preferred embodiment of the present invention in which the magnetic storage medium which constitutes the chief feature of this invention is shown symbolically, Fig. 2 shows a plan view of the details of the storage and read out mechanism shown symbolically in Fig. 1, Fig. 3 shows a fragmentized and a section view taken along the lines 3—3 of Fig. 2 and illustrates the relative position of the write-in apparatus, storage medium, and read-out means, Fig. 4 is a partial elevational view of the present invention showing the relation and arrangement of the elements of the read out means comprising armatures and contacting springs, Fig. 5 shows successive rows of faces 120′ of the radial spokes of the memory means, the shaded faces indicating a representative magnetization pattern, and Fig. 6 shows a schematic representation of the circuits and components of another embodiment of the present invention in which certain of the contact springs associated with the operating keys have been replaced by unilateral conducting elements.

In a preferred embodiment of the present invention as illustrated in the accompanying drawings, a magnetic storage medium, shown most clearly in Fig. 2, constitutes the means whereby digital information is stored until such time as required. Referring to Figs. 2 through 4, the storage means is seen to comprise a plurality of disks 100W, 200X, 300Y and 400Z rigidly mounted on a common shaft. Each of the disks is divided into a plurality of radially extending spokes each of which is designated on the disks by the reference number 120. As shown in Fig. 5, the radial spokes 120 of each of the disks are so disposed with respect to the spokes of the other disks that the faces 120′ of the spokes 120 present a plurality of rows of faces, each row of which is parallel with the axis of the disks. Associated with each of the disks is a write-in means comprising the coils 206, 207, 208, and 209 and their respective pole-pieces H100, H200, H300, and H400. The said pole-pieces are so arranged that as the disks are rotated the rows of faces 120′ of the radially extending spokes 120 of each of the disks will successively pass the faces 100′ through 400′ of the pole-pieces H100 through H400, respectively, individually associated with the disks. If an energizing current is now passed through one of the coils 206, 207, 208, or 209 a magnetic flux will be induced in the associated pole-piece which flux will be transferred to the particular radial spoke 120 momentarily appearing opposite the face of the pole-piece, the coil of which is being energized. In this manner combinations of radial spokes 120 in each row can be magnetized, the combinations depending upon which of the coils 206 through 209 are energized as the disks 100W through 400Z are rotated to bring successive rows into alignment with the pole faces.

A plurality of manually operable keys K1 through K0, shown in Fig. 1, are provided by means of which the particular combinations of the radial spokes 120 to be magnetized is controlled. Thus, for example, if the digit "3" is to be registered, the key K3 is operated and a source of potential, in this embodiment a charged condenser C10, is caused to be connected to the coils 206 and 209 associated respectively with the pole-pieces H100 and H400. The coils 206 and 209 being selected in accordance with a predetermined code to be described hereinafter. Thus, the radial spoke 120″ shown in Fig. 2 as being momentarily opposite the face 100″ of the pole-piece H100 in which magnetic flux is being introduced by the energization of the coil 206, will be magnetized. Similarly the radial spoke 120″ which at this time will be opposite the face 400″ of the pole-piece H400 will also be magnetized due to the energization of the coil 209. Almost any series of digits can be registered in code in this manner, the number of digits being limited only by the number of rows of radial spokes provided in the disks 100W through 400Z.

Associated with each of the disks 100W through 400Z and individual thereto are read-out means comprising detection armatures 110, 210, 310, and 410 controlling respectively the contacts 100, 200, 300, and 400. After all of the digits to be registered have been stored in the disks as combinations of magnetizations of the radial spokes 120, another key, the start key KS, may be operated whereupon a rotating means, also provided, is operated to simultaneously rotate the disks 100W through 400Z whereby the rows of radial spokes 120 are successively brought into alignment with the detection armatures 110, 210, 310, and 410. The armatures 110 through 410 are so arranged with respect to the radial spokes 120 and the magnetizations of the spokes are so effective that the magnetizations periodically attract the armatures as the disks are rotated past. In this manner at any particular point of rotation of the disks a particular combination of the contacts 100 through 400 may be closed. The contacts 100 through 400 may thereby be controlled in correspondence with combination of magnetizations of the radial spokes 120 representing the digit originally registered by the operation of one of the keys K1 through K0. Had the digit "3" been registered in the manner described above, the contacts 100 and 400 would consequently have been closed, which combination of magnetizations of the radial spokes 120, that is, the magnetization of the radial spoke 120″ of the disk 100W and the spoke 120″ of the disk 400Z originally set up by the operations of the key K3.

A two level 10 point retranslate switch S170 having two wipers, 171 and 172, provides the means whereby the digits originally registered and stored in the storage medium by means of combinations of magnetized radial spokes are retranslated into digital markings whereby the desired digital impulses may ultimately be transmitted. Associated with the wipers 171 and 172, respectively, are the impulse arresting relays R200 and R300. The read-out means are associated with the retranslate switch S170 in a manner such that as particular combinations of the contacts 100 through 400 are closed, ground potential will be extended to particular contacts on each level of the switch S170. Thus, as in the foregoing description, if the digit "3" had been registered in the radial spokes 120 the faces 120′ of which are momentarily opposite the armatures 110 through 410, the particular armatures 110 and 410 will be attracted to the magnetized radial spokes 120 of the respective disks 100W and 400Z and ground potential will be extended from the contact 100 to the contact 3 of the upper level of the contact banks and from the contact 400 to the contact 3 of the lower level of the contact bank of the retranslate switch S170. When the wipers 171 and 172 are now simultaneously caused to be rotated, both of the impulse arresting relays R200 and R300 will be operated. The last-mentioned relays cooperate to control a circuit which in turn is effective to measure the number of impulses transmitted in any one series of digital impulses.

Associated with the present invention is a source of impulses 180 which are generated at the preferred rate of 10 impulses per second. The impulses thus generated are utilized to periodically energize pulse-in relay R120, which relay in turn operates to periodically interrupt an output circuit at a frequency corresponding to that of the impulse source 180. The last-mentioned circuit is then closed under the control of the cooperating impulse arresting relays R200 and R300 to effectively interrupt the transmission of further impulses when the required number of impulses have been transmitted. In the above case where the digit "3" was registered and the relays R200 and R300 were operated when the wipers 171 and 172, respectively, were advanced to the third contact position, only three impulses would accordingly have been transmitted over the conductors 146 and 147 to the using apparatus. Thus, generally has been outlined the mode of operation of the present invention when a digit has been registered, the manner of digit storage and, alternately, its transmission in the form of series of representative digital impulses.

A detailed description of the components and organization and the specific manner of operation of the present invention will now be provided. The preferred construction and organization of the memory means which comprises an essential part of this invention will first be considered with particular reference to Figs. 2 through 4 of the drawings. A plurality of disks, in the preferred embodiment of this invention, four in number, 100W, 200X, 300Y, and 400Z, are mounted on a common arbor 262 having a concentric flange 262′ at its lower extremity. The lower of the disks 400Z is so mounted that its lower surface bears on the upper surface of the flange 262′. Separating the remaining disks 100W, 200X and 300Y from each other and also mounted on the arbor 262 are three washers 261 which maintain the disks at a suitable distance from each other. The disks and the washers may be secured against relative movement with each other in any suitable manner, such as that in the preferred embodiment of this invention where the other extremity of the arbor 262 is threaded to receive a non-magnetic ratchet wheel 221 which may in this manner be screwed rigidly in place to prevent any movement of the elements. The ratchet wheel 221 may then be locked in place by any suitable means, such as a Spanier locking nut 263. Each of the afore-mentioned disks includes a plurality of radially extending spokes 120. In the preferred embodiment of this invention it was considered preferable to limit the number of the spokes 120 for each disk to 50, however, it is to be understood that neither the number of disks nor the number of radial spokes need be limited to the numbers shown. The disks are so mounted and arranged on the arbor 262 that the corresponding spokes of each disk present peripheral faces 120′ arranged in rows, each of which rows is aligned in parallel with the axis of the arbor 262 and the disks. Enclosing the disks 100W through 400Z is an enclosing shell 250 having at its center and extending axially from its base 250″, a stem 250′. The arbor 262 is then journaled on the stem 250′ to be freely rotatable thereon.

The washers 261, the arbor 262, and the shell 250 are preferably constructed of magnetic metal having a high permeability. In a device constructed according to this invention Allegheny Electric metal was found to be highly suitable for this purpose. The disks 100W through 400Z are preferably formed from a metal having only a relatively high permeability as compared with the metal of the elements listed in the immediately preceding.

The enclosing shell 250, the stem 250′ of which extends a short distance beyond the upper surface of the ratchet wheel 221, is held rigidly between two parallelly disposed flanges 203′ and 203″ of the mounting frame 203. The stem 250′ may be drilled to admit holding means such as the bolt 219 which may then clamp the enclosing shell 250 between the two flanges of the frame 203 by means of the nut 218. The elements including the disks 100W through 400Z and the ratchet wheel 221 can be rotated as a unit freely within the enclosing shell 250 about the stem 250′.

An operating electromagnet M160 is mounted in any convenient manner, such as the means 241 on a perpendicularly turned portion 253 of the frame 203 and constitutes the actuating means for rotating the above described disks. An armature 225 including an armature lever 227 is rotatably mounted on a swivel pin 226 which extends through and is rigidly secured between a pair of parallel flanges 238 of the frame 203, which flanges are turned in an opposite direction from that of the flanges 203′ and 203″. The armature 225 is adapted to be attracted upon the energization of the electromagnet M160 to the pole 252 thereby pivoting the armature lever 227 about the pin 226 in a clock-wise direction as viewed in Fig. 2. A tension spring 235 is extended between a stud pin 236 staked in the armature lever 227 and a lug 237 on the mounting frame 203 and serves to return the armature lever 227 to a normal position when operated therefrom by the energization of the electromagnet M160. An operating pawl 228 adapted to engage the teeth of the ratchet wheel 221 is pivotally mounted on the extremity of the armature lever 227 by means of a swivel pin 230. A tension spring 229 which may be connected between the armature lever 227 and the pawl 228 in a manner as shown in Fig. 2 maintains the operating end of the pawl 228 in engagement with the teeth of the ratchet wheel 221. A mounting plate 224 having a perpendicularly turned portion 254 is rigidly secured to the portion 253 of the mounting frame 203 by the retaining means 241 which also secures the magnet M160. The mounting plate 224 is supported at the other extremity on the swivel pin 226 by means of a pair of slotted ears 240 adapted to admit the pin 226. Mounted on the plate 224 are a pair of contact springs 232 controlling the contacts 161, which springs may be insulated from each other and the mounting plate 224 by the insulating elements 234 and secured to the plate 224 by screw means 233. A buffer 231 affixed to the armature lever 227 operates against an extension of one of said pair of springs 232 to open the contacts 161 each time that the armature lever 227 is moved from its normal position, the contacts 161 then performing the well-known function of interrupting the energizing circuit for the magnet M160 each time the armature lever 227 is operated. When the magnet 160 is energized the armature 225 and the armature lever 227 are pivoted in a clockwise direction as viewed in Fig. 2 about the pin 226 against the bias of the spring 235. The lever 227 withdraws the operating pawl 228 at this time from engagement with the ratchet tooth of the wheel 221 with which it was engaged and, by the action of the spring 229, the pawl 228 is brought into engagement with the next successive tooth of the ratchet wheel 221. When the magnet M160 is deenergized the action of the tension spring 235 causes the operating pawl 228 to advance the ratchet wheel 221 and the disks 100W through 400Z one rotary position in a clockwise direction as viewed in Fig. 2, that is, the disks will be rotated an amount equal to the angular spacing of the radial spokes 120, in this embodiment, an amount equal to 1/50 of a complete revolution. If the magnet M160 is now periodically energized and deenergized the storage disks will be stepped through successive rotational positions. To insure that each deenergization of the magnet M160 will result only in precisely the angular rotation stated, a guide block 256 is provided which acts as a stop for the pawl 228 and limits its travel due to the operation of the spring 235. The block 256 may be adjustably mounted on the flange 203′ through the slot 257′ by the screw means 257. In addition, a flat arresting spring 222 mounted on the frame 203 by screw means 223 is biased at one extremity against the teeth of the ratchet wheel 221 in order to retain the disks 100W through 400Z in a fixed rotary position between the operations of the magnet M160 and to prevent any rotation of the disks in a counterclockwise direction.

Write-in means comprising four electromagnets 206, 207, 208 and 209, having, respectively, the pole-pieces H100, H200, H300 and H400 are held in a fixed relation with the storage disks 100W through 400Z by means of a mounting bracket 204. The bracket 204 may be secured to the enclosing shell 250 by means of screws, such as the screws 258. A perpendicularly turned portion 205 of the bracket 204 provides a means to which the electromagnets 206 through 209 may be mounted. This may be accomplished in any convenient manner, such as the screw means 210. In the particular embodiment of this invention under consideration the electromagnets 206 through 209 have been shown in Fig. 3 as being mounted side-by-side. It should be understood, however, that the electromagnets of the write-in means may be mounted with respect to each other in any convenient fashion as the space requirements of a particular installation of this invention may dictate. Essential to this invention, however, are the relative positions of the pole-pieces of the said electromagnets. It is essential that the pole-piece H100 of the electromagnet 206 be associated with the magnetic storage disk 100W, the pole-piece H200 of the electromagnet 207 with the disk 200X, the pole-piece H300 of the electromagnet 208 with the disk 300Y, and finally, the pole-piece H400 of the electromagnet 209 with the storage disk 400Z. More particularly, the pole-pieces H100 through H400 are so arranged as to be associated, respectively, with the individual faces 120′ of each row of such faces 120′ for each rotary position of the storage disks. To insure that the pole-pieces H100 through H400 will be maintained in a positive relation with each row of radial spoke faces 120′, a clamping means 211, of a non-magnetic material is provided which may be secured to the mounting bracket 204 in any convenient manner, such as the non-magnetic screw means 212. To obtain the maximum effectiveness of magnetizations of a particular polarity induced in the radial spokes, a virtually closed magnetic circuit is traced through the pole-pieces of the electromagnets. The brackets 205 and 204, the enclosing shell 250, the radial spokes 120 and the radial spoke 120″. An aperture 213 in the enclosing shell 250 admits the pole-pieces H100 through H400 into close proximity with the faces 120′ of the radial spokes 120.

Also associated with the storage disks are readout means comprising the spring pairs 100′—111′, 210′—211′, 310′—311′, and 410′—411′ shown most clearly in Fig. 4. Affixed to an extension of one of each of the said spring pairs, respectively, are the permanent magnet detection armatures 110, 210, 310, and 410, which are preferably formed of a low permeability metal, such as for example, the metal commercially designated as Alnico. The said spring pairs are held in a fixed relation with the storage disks by means of a non-magnetic mounting bracket 214 which bracket may be secured to the enclosing shell 250 by means of screws, such as the screws 217. The spring pairs may be mounted on the bracket 214 by means of the screws 215 and a non-magnetic retaining plate 215′ and are separated from each other and the bracket 214 by means of the insulator elements 216. The spring pairs 110′—111′, 210′—211′, 310′—311′ and 410′—411′ are operable respectively to close the contacts 100, 200, 300 and 400. The detection armatures 110 through 410 are arranged with respect to the faces 120′ of the radial spokes 120 in a manner similar to that of the pole-pieces H100 through H400. The alignment of the armatures 110 through 410 in this embodiment, as indicated in Fig. 2, will be an angular distance removed from the pole-pieces equal to the angular distance between any two rows of radial spokes 120. The said spring pairs also may be disposed wherever convenient, the only requirement being that the said armatures are aligned opposite a row of the faces 120′ of the radial spokes 120 in any fixed rotary position of the storage disks as illustrated in Fig. 4, and further that the armatures be disposed in advance of the pole-pieces with respect to the direction of rotation of the storage disks. The pole-pieces H100 through H400 have been slightly off-set for convenience in mounting in the required proximity to the armatures 110 through 410. The aperture 213 in the enclosing shell 250 also admits the detection armatures 110 through 410 into close proximity with the faces 120′ of the radial spokes 120. Shielding elements 260 of a magnetic metal are mounted on the enclosing shell 250 over the aperture 213 and isolate the detection armatures from each other and from the write-in pole-pieces. The shielding elements 260 also serve the function of providing a low reluctance path for magnetic flux operating upon the armatures.

Each of the radial spokes 120 in its normal magnetic condition is magnetized to present a face 120′ of a particular polarity with the opposite polarity appearing at the hub of the storage disk. As is indicated in Fig. 2, in this embodiment the peripheral extremity of the radial spoke 120″ has been poled north with the south pole appearing at the hub. The storage disks, however, being formed from metal having relatively high permeability, the polarity of the individual magnets constituting the radial spokes 120 is readily reversed by the application of an external magnetic field. If an energizing voltage is now applied to any one of the electromagnets 206, 207, 208 or 209 the corresponding pole-piece H100, H200, H300, or H400 will be magnetized, the direction of the current in the electromagnet being in such a direction that the polarity of the pole-piece face, such as the face 100″, will be opposite to that of the particular opposing face 120′ of the radial spoke 120. For example, had the electromagnet 206 been energized, the pole-piece H100 would have been magnetized so as to present a south pole opposite the north pole of the radial spoke 120″. The polarity of the spoke 120″ will now be reversed due to the influence of the greater magnetic flux induced by the magnetized pole-piece H100. Since a magnetic circuit is readily completed through the enclosing shell 250 in close proximity with the remaining radial spokes 120, which shell 250 is removed some distance from the meeting of the faces 100″ and 120′, and because of the shielding elements 260, the influence of the magnet flux of the pole-piece H100 will operate only to reverse the magnetic polarity of the radial spoke 120″ immediately opposite the pole-piece face 100″.

If at this time the storage disks are rotated through the operation of the successive energization and deenergization of the magnet M160 and consequent operation of the pawl and ratchet mechanism described hereinbefore, each north pole of the radial spokes 120 of the storage disks will be successively brought opposite the detection armatures, such as the armature 110. The permanent magnet detection armatures 110 through 410, however, are permanently magnetized so that a like pole to that of the normal polarity of the spoke faces 120′ is normally presented to the faces 120′ as the storage disks are rotated past the armatures. In Fig. 2, for example, the detection armature 110 is magnetized to present a north pole to the north poles of the normally magnetized radial spokes 120. As a result, the interaction of the similarly-poled extremities of the armatures 100 through 410 and the radial spokes 120 will cause the detection armatures 110 to be repelled by the normally magnetized radial spokes 120 as the radial spokes 120 are brought successively into operative relation with the armatures 110 through 410. Since this repelling force will vary from a maximum when a radial spoke 120 is directly opposite a detection armature, such as the armature 110, to a minimum when the detection armature is directly opposite the interval between the radial spokes 120, some oscillation of the springs 110′ through 410′ to which the detection armatures 110 through 410 are respectively secured, may take place as the storage disks are rotated. To limit these oscillations and to prevent their intensification to the point where a detection armature is vibrated into contact with the passing radial spokes 120, damping means are provided comprising a plurality of non-magnetic adjustable screw means 216′ maintained directly behind each of the detection armatures 110 through 410 by means of an extension of the non-magnetic retaining plate 215'. Thus by adjusting the four screw means 216' the travel of the spring 110' through 410' is readily controllable.

As the rotation of the storage disks is continued the particular radial spoke 120'' of the storage disk 100W, the polarity of the magnetism of which was reversed by the action of the magnet 206 and the pole-piece H100 as described above, will eventually be brought opposite the detection armature 110. In this case, the polarity of the armature 110 and the polarity of the radial spoke 120'' will be opposite and the armature 110 will be attracted to the spoke 120''. As a result, the spring 110' will close the contacts 100 which was the desired consequence of the operation of the magnetic storage disks. It is obvious that in the manner described in the foregoing description, an electrical impulse generated by the operation of one of the keys K1 through K0 and manifested in the form of an energization of the magnet 206 has been stored in the storage disk 100W in the form of a magnetization of a particular polarity of the radial spoke 120'' and read out an interval later, corresponding to substantially a revolution of the storage disk 206, by the operation of the contacts 100. If the rotation of the storage disks is continued into the second revolution and if at the beginning of the second revolution the polarity of the voltage applied to the electromagnet 206 is reversed so as to reverse the direction of current through its windings, the pole-piece H100 will be magnetized so that the flux acting upon the radial spokes 120 will aid the magnetization originally appearing there and any opposite magnetizations representing coded markings will be erased.

Referring now to Fig. 5, it is obvious that in this embodiment of the present invention in which four storage disks, each having fifty radial spokes, are provided, the total number of combinations of magnetizations of the four faces 120' of any one of the rows *a* taken successively 1, 2, 3, and 4 at a time is 15. Thus it is possible in the particular embodiment under consideration to store 50 characters, each character presenting a choice of 15 available combinations of magnetizations of the radial spokes 120 in a row *a*. Obviously the number of individual characters which may be stored and the number of different characters available are limited respectively only by the number of radial spokes in a storage disk and the number of such storage disks. For example, by increasing the number of disks to 5 or 6 the number of combinations, that is, of different characters, will be increased respectively to 31 or 63. In the present application of the memory arrangement according to this invention it is necessary to provide for choice among only 10 characters, since only the digits 1 through 9, and 0 are to be represented by coded markings in the storage disks.

Accordingly, the well-known WXYZ code is here used. This code is also employed in the Automatic Toll Ticketing System as described in the copending application of Ivan V. Coleman, Serial No. 487,500, filed February 11, 1955, and is convertible with numeric digits as follows:

| | |
|---|---|
| 1 | WX |
| 2 | WY |
| 3 | WZ |
| 4 | XY |
| 5 | XZ |
| 6 | YZ |
| 7 | W |
| 8 | X |
| 9 | Y |
| 0 | Z |

If the radial spokes of each of the storage disks 100W, 200X, 300Y, and 400Z are respectively designated as W, X, Y, and Z spokes, and each of the rows *a* of spoke faces 120' are capable of magnetically representing any of the said digits, it is obvious that 50 digits, each digit being any digit from 1 through 9 or 0 can be stored in this particular embodiment of the present invention. Referring to the representative diagram of Fig. 5, if the shaded faces 120' represent the radial spokes 120 in which magnetizations have been induced, then, by referring also to the foregoing conversion table, it is evident that the seven digit number 549–0875 has been registered and stored in the storage disks 100W through 400Z.

Turning from consideration of the memory system employed in this invention, the circuit arrangement and organization will now be described with respect to its operation. The operation of this invention will be described in connection with the registering of the digits 549, which description, it is believed, will be sufficient for a complete understanding of the operation in connection with the remaining digits. At the outset the condenser C10 is charged from ground to battery over the normally closed contacts associated with the successive operating keys as follows: ground, contacts 03, 93, 83, 73, 63, 53, 43, 33, 23, and 13, positive side of condenser C10, contacts 11, 21, 31, 41, 51, 61, 71, 81, 91, 01, S1 and negative battery. To register the digit "5" the key K5 is operated whereupon the associated normally closed contacts 51 and 53 are opened and the contacts 52, 54, and 55 are closed. At the contacts 52 ground potential is applied to the negative side of the condenser C10 over an obvious circuit, and at the contacts 54 and 55 negative battery is applied to the positive side of the condenser C10 over the following circuit: negative battery at the contacts 102, conductor 127, the winding of the magnet 207, conductor 152, contacts 106, conductor 132, and contacts 55, 43, 33, 23, 13, and the positive side of the condenser C10. Negative battery will also be applied to the positive side of the condenser C10 from battery at the contacts 102, conductor 127, winding of the magnet 209, conductor 154, contacts 111, conductor 134, contacts 54, 43, 33, 23, and 13. The condenser C10 will discharge through the two circuits just traced and a momentary energizing pulse of a voltage double that normally provided by the voltage source will be applied to the windings of the magnets 207 and 209, the duration of the pulse depending upon the RC constant of the condenser and the resistance of the windings. However, the pulse is of sufficient duration to magnetize the pole-pieces H200 and H400 whereby the normal polarity of the radial spokes 220'' and 420'' is temporarily reversed in the manner described hereinbefore. It is evident by reference to the conversion table herein provided that the digit "5" has in this manner been stored in the form of magnetization combination XZ.

Simultaneously with the provision of a discharge path through the said windings, the operation of the key K5 also establishes an operating circuit for the motor magnet M160 which may be traced as follows: ground at the contacts 03, contacts 93, 83, 73, 63, 52, 41, 31, 21, 11, conductor 142, contacts 113, the winding of the magnet M160 to battery. The motor magnet M160 operates and when the key K5 is released, the motor magnet M160 deenergizes whereupon the storage disks 100W through 400Z are stepped one rotary position in a clockwise direction as viewed in Fig. 1. The next succeeding row of radial spokes 120 is now opposite the pole-pieces H100 through H400 and upon the re-establishing of the charging circuit for the condenser C10 as previously traced, the condenser C10 will again be charged.

Operation of the key K4 to register the digit "4" opens the associated contacts 41 and 43 and closes the contacts 42, 44 and 45. The discharging path for the condenser C10 will be similar to that for the registration of the digit "5" except that the contacts 42, 44 and 45 are included rather than the contacts 52, 54 and 55 and the winding of the magnet 208 is included rather than the winding of the magnet 209. The circuit for the magnet 208 may be traced from a common point connected to the positive side of the condenser C10 as follows: contact 44, conductor 133, contact 108, conductor 153, winding of magnet 208, common conductor 127, and contact 102 to negative battery. The magnets 207 and 208 will now be energized by the discharge of the condenser C10 and the pole-pieces H200 and H300 will temporarily reverse the normal polarity of the next succeeding radial spokes 120 of the storage disks 200X and 300Y, thereby recording the digit "4" as a magnetization of the spokes XY of the row representing the second digit registered as shown in Fig. 5. At the same time and in the manner previously described the motor magnet M160 will again be energized and, when the key K4 is released, be deenergized, to step the storage disks 100X through 400Z a further rotary position in the same direction.

When the key K9 is operated to register the digit "9" the associated contacts 91 and 93 are opened and the contacts 92 and 94 are closed thereby establishing a discharge path for the condenser C10 which was again charged in the manner previously described. The condenser C10 will now discharge over the circuit including the winding only of the magnet 208, which circuit has been fully described above. The discharge of the condenser C10 aiding the normal voltage source will now energize the magnet 208 and its pole-piece H300 will reverse the polarity of the third successive magnetized radial spoke 120 appearing opposite it in accordance with the diagram of Fig. 5 wherein the digit "9" is indicated as a "Y" only magnetization. The energizing circuit for the motor magnet M160 will again also be completed and when the key K9 is released the storage disks 100W through 400Z will be stepped into still a further rotary position. Release of the key K9 also reestablishes a charging circuit for the condenser C10 which will accordingly recharge. The remaining digits 0875 are registered and stored in a manner similar to that for the digits described, the particular keys operated through their associated contacts selecting the appropriate combinations of magnets 206 through 209 to be energized. The storage disks 100W through 400Z will be advanced one rotary position after the registration of each digit and after each registration the condenser C10 will be recharged.

Assuming that the entire series of digits indicated and only that series having been registered in the manner described, it is now desired that impulses representing the registered digits be transmitted out. It will in this case be necessary that the storage disks 100W through 400Z be rotated to a point where the first coded magnetizations of the radial spokes 120 will appear opposite the read-out detection armatures 110 through 410. This is accomplished by operating the start key KS which, at its associated contact S2, completes an energizing circuit for the motor magnet M160, which circuit may be traced as follows: ground at the contacts S2, conductor 128, contacts 402, conductor 124, interrupter contacts 161, the winding of the magnet M160 to negative battery. At the contact S1 a shunting circuit for the motor magnet M160 is opened to permit the magnet M160 to energize. If the start key KS is held in operated position the magnet M160 will alternately open and close its own energizing circuit to thereby successively step the storage disks 100W through 400Z in a rotary direction. This rotation continues as long as the start key KS is held operated until a radial spoke 120 marked by a reverse magnetization appears under one of the detection armatures 110 through 410. Such will be the case when the radial spokes 220" and 420" of the disks 200X and 400Z, respectively, appear. At this point in the rotation of the disks, the permanent magnet detection armatures 210 and 410 will be attracted to the oppositely poled magnetic radial spokes 220" and 420", respectively, thereby closing the contacts 200 and 400. An energizing circuit will now be completed for the start relay R400 which circuit may be traced from ground at the contacts 200, spring 210', conductor 136, a unilateral conducting element 11, the winding of the relay R400 to negative battery. It should here be noted that ground may be completed to the start relay R400 by the operation of any one of the armatures 110 through 410 through the respective unilateral conducting elements 14, 11, 10, and 12. At the same time that ground potential originating at the contacts 200 and 400 is applied to the winding of the start relay R400, the ground potential from the contacts 200 is applied to the contacts 4, 5 and 8 of the upper level of bank contacts of the retranslate switch S170 and to the contact 1 of the lower level of that switch. The ground potential from the contacts 400 is similarly applied via the conductor 138 to the 0 contact of the upper level of the bank contacts of the retranslate switch S170 and to contacts 3, 5 and 6 of the lower level of that switch. The coded magnetization pattern of the row of radial spokes 120" through 420" has thus been read out and now appears as a marking ground pattern on the bank contacts of the retranslate switch S170. Since all of the conductors 135, 136, 137, and 138 connect to the winding of the relay R400, the unilateral conducting elements 10, 11, 12 and 14, which may conveniently be selenium rectifiers, are provided to insure that only the contacts of the retranslate switch S170 associated with the particular conductors which are grounded by operated detection armatures will be marked by these grounded potentials.

The start relay R400 now operates and, at its contacts 402, opens the energizing circuit for the motor magnet M160 to thereby prevent further rotation of the storage disks. The rotation of the disks then is interrupted at the point where the coded magnetizations representing the digit "5" appear under the detection armatures 110 through 410. At its contacts 403, the relay R400 completes an energizing circuit for the relay R100 which circuit may be traced from ground at the contacts 403, conductor 144, the winding of the relay R100 to negative battery, and at its contacts 401, opens a point in an energizing circuit for the relay R600. The relay R100 operates and, at its contacts 102, 104, 106, 108, and 111 opens the discharging circuit of condenser C10 thereby preventing any further registering and storing of digits in the disks 100W through 400Z in the event that one of the keys K1 through K0 is inadvertently operated. At its contacts 101, 103, 105, 107, and 109, the relay R100 prepares points in a number of circuits for reversing the polarity of the voltage applied to the magnets 206 through 209 of the write-in means whereby the erasing function is accomplished, which function will be described in detail hereinafter. Also, at its contacts 113 and 112, the relay R100 operates to transfer possible control of the motor magnet M160 from the keys K1 through K0 to the relay R900, as will be described hereinafter. Finally, at its contacts 114, the relay R100 connects ground to the energizing circuit of the pulse-out relay R110 which circuit may be traced as follows: ground at the contacts 403, conductor 144, conductor 126, contacts 114, conductor 125, contacts C3, conductor 129, contacts 801, contacts 904, contacts 123, and the winding of the relay R110 to battery.

It is to be noted at this point that the pulse-in relay R120 is being periodically energized in response to the periodic impulses generated by the source 180, which source 180 is connected in the energizing circuit of the relay R120. The pulse-in relay R120 is accordingly operated and in turn operates its contacts 121, 122 and 123 at a frequency of approximately 10 operations per second which is the frequency of the generating source 180. However, prior to the opening of the contacts 121 or after the closing of the contacts 901, the periodic operation of the contacts 121 will obviously have no effect upon any external circuit, not shown, connected to the pulse-out conductors 146 and 147 due to the bridging at these said contacts. Between the periodic operations of the pulse-in relay R120 the contacts 123 will be closed and the previously described energizing circuit for the pulse-out relay R110 will be completed. The relay R110 is of the slow-to-release type and when operated will remain operated during the periodic opening of the contacts 123. The relay R110 operates, at its contacts 116 to shunt the periodically operating contacts 123 and, at its contacts 117, opens the bridge across the pulse-out conductors 146 and 147, thereby commencing the first open circuit interval, corresponding to the well-known open circuit impulse generated by a telephone subscriber dial to be transmitted to external user circuits, not shown. The duration of the open circuit impulse is determined by and the interruption of the open circuit interval is controlled by the re-operation of the pulse-in relay R120 which again closes its contacts 121 to close the circuit to the external user circuits, not shown, in response to the pulsing of the generator source 180. The periodic operation of the pulse-in relay R120 will now result in a series of open circuit impulses to be made available at the pulse-out conductors 146 and 147.

When the pulse-out relay R110 operates, and upon the first deenergization of the pulse-in relay R120, an energizing circuit is completed, at the contacts 115, to operate the motor magnet M150 which circuit may be traced from ground at the contacts 122, contacts 115, conductor 144, and the winding of the magnet M150 to battery. The operating mechanism of the switch S170 associated with the magnet M150 is similar to that associated with the magnet M160 and operates to step the wipers 171 and 172 upon deenergization of the magnet M150. When the relay R120 is operated in response to a periodic pulse from the source 180, at its contacts 122, it opens the energizing circuit to the magnet M150 which thereupon restores to step the wipers 171 and 172 in a clockwise direction to the first decimal contact 1 of the associated contact bank. The stepping operation of the motor magnet M150 continues in time with the impulse being transmitted under the control of the pulse-in relay R120 until the wipers 171 and 172 simultaneously encounter ground on any of the corresponding decimal contacts on the contact bank in which case obvious energizing circuits are simultaneously completed to operate the interrupt relays R200 and R300, respectively. Operation of the relays R200 and R300 completes, at the contacts 201 and 301, respectively an energizing circuit to ground over the conductor 139 and the winding of the start pulse-out relay R800 to battery. The relay R800 operates and, at its contacts 802, completes an energizing circuit for the impulse arresting relay R900 as follows: ground at the contacts 802, winding of the relay R900, conductor 144′, contacts 141 of the operated off-normal switch ON140 of the rotary switch S170 to battery. At its contacts 801, the relay 800 also operates to permanently open a point in the previously traced energizing circuit for the pulse-out relay R110 which relay, after a short interval, restores. The restoration of the relay R110 opens, at the contacts 115, the previously traced energizing circuit for the motor magnet M150 thereby depriving the pulse-in relay R120 of control of the motor magnet M150 and the stepping of the retranslate switch S170.

The relay R900 operates, and, at its contacts 901, again bridges the pulse-out conductors 146 and 147 thereby rendering ineffective any further periodic operation of the pulse-in relay R120 and its contacts 121. Thus, since the retranslate switch S170 under the control of the pulse-in relay R120 at the contacts 122 was caused to step until its wipers encountered ground which, as previously described, appeared on several contacts of the two levels but only on the contacts 5 of both levels, the impulse arresting relay R900 operated to bridge the pulse-out conductors 146 and 147 when five open circuit impulses had been made available to the conductors 146 and 147. Five impulses have thus been transmitted in accordance with the digit "5" registered by the operation of the key K5. The relay R900 further operates, at its contacts 902, to complete an obvious locking circuit for itself and, at its contacts 903 completes a self interrupted energizing circuit for the motor magnet M150 which may be traced as follows: ground at the contacts 403, conductor 144, contacts 114, conductor 125, contacts C3, conductor 129, contacts 903, conductor 145, contacts 131 of the operated off-normal switch ON130 also of the rotary switch S170, interrupter contacts 151, the winding of the magnet M150 to battery. At its contacts 904, the relay R900 opens an additional point in a previously traced energizing circuit for the pulse-out relay R110, and, at its contacts 905, completes an obvious energizing circuit for the relay R500 and at the same time completes an energizing circuit for the motor magnet M160 which magnet 160 is energized over a circuit which may be traced from ground at the contacts 905, the conductor 143′, contacts 112 and the winding of the magnet M160 to battery. Finally, at its contacts 906, the relay R900 opens a point in a previously mentioned voltage polarity reversing circuit for the magnets 206 through 209 to be described in detail below.

When the motor magnet M150 is energized over the previously traced energizing circuit it operates and, at its interrupter contacts 151, opens its energizing circuit and, deenergizing, steps the wipers of the retranslate switch S170 to the next or 6th contact position where no ground is encountered at this time and the energizing circuit for the magnet M150 is again completed causing the magnet M150 to again operate. The periodic energization and deenergization of the magnet M150 is continued until the wipers 171 and 172 again reach their home positions. As soon as the magnet M150 steps the wipers 171 and 172 from the grounded contacts 5 of each bank level the relays R200 and R300 will restore thereby opening, at the contacts 201 and 301, respectively, the previously traced energizing circuit for the relay R800. The relay R800 restores, opens a multiple energizing circuit for the relay R900 at the contacts 802. Also, at the contacts 801, a point in the previously traced energizing circuit for the pulse-out relay R110 is prepared. When the home position of the wipers 171 and 172 is reached through the operation of the magnet M150 both of the off-normal switches ON130 and ON140 will restore and thereby open the contacts 131 and 141, respectively. Since the contacts 131 open the energizing circuit for the magnet M150, this magnet will not again at this time be energized. Also at the contacts 141, the energizing circuit of the pulse-out relay R900 will be opened. However, the relay R900 is of the slow-to-release type, the release time being so determined that the time required to restore the retranslate switch S170 when added to the release train of the relay R900 will equal the interdigital pause between the transmission of each series of digital impulses. The relay R900 finally restores and at its contacts 901, again opens the bridge across the pulse-out conductors 146 and 147, at contacts 902 opens its own locking circuit, at contacts 903 opens a point in the alternate energizing circuit for the magnet M150, at contacts 904 prepares a point in the energizing circuit for the pulse-out relay R110, at contacts 905 opens the multiple energizing circuit for the erase relay R500 and the motor magnet M160, and, at the contacts 906, connects ground to the erasing circuit to be described.

When the energizing circuit for the motor magnet M160 is interrupted at the contacts 905, the magnet M160 is deenergized with the result that the storage disks 100W through 400Z are rotated one rotary position thereby placing the next succeeding row of radial spoke faces 120′ which was opposite the read-out armatures opposite the pole-pieces H100 through H400 and the next row of spokes having coded magnetizations thereon are moved opposite the read out armatures. The energizing circuit for the erase relay R500 is simultaneously interrupted at the contacts 905 with the circuit for the magnet M160, however, the relay R500 is of the slow-to-release type and remains operated for a short interval of time thereby retaining closed for this interval, at its contacts 501, a voltage reversing circuit which may be traced as follows: ground at the contacts 906, contacts 501, conductor 143, contacts 101, common conductor 127, through the windings of each of the magnets 206 through 209, conductors 151, 152, 153, and 154, respectively, and contacts 103, 105, 107, and 109, respectively, to battery. The erase relay R500 will remain operated for a sufficient duration to enable the reversed current passing through the windings of the magnets 206 through 209 to reverse the magnetic polarity of the pole-pieces H100 through H400, respectively, whereby any of the radial spokes 120 immediately opposite the said pole-pieces will be restored to its normal polarity in the event that its magnetic polarity had been reversed at the time of the registration of the digits. The coded magnetic markings are in this manner erased preparatory to the registration and storing of a new series of digits.

As soon as the next row of radial spokes 120 of the storage disks 100W through 400Z has advanced into position opposite the read-out means, the pulse-out relays are operated to begin the transmission of the second series of digital impulses. Coded in as magnetizations of this said row of radial spokes 120, it will be recalled, is the digit "4." At this time the permanent magnet detection armatures 210 and 310 will be attracted to the radial spokes 120 of the disks 200X and 300Y which spokes have been magnetized to represent the coded markings XY which in turn represent the digit "4." Other previously operated detection armatures will be restored and only the contacts 200 and 300 of the read-out means will now be closed. Ground will at this time be extended from the contacts 200 and 300 via the conductors 136 and 137, respectively, to re-operate the start relay R400 and to mark the proper contacts of the contact bank of the retranslate switch S170. Of this contact bank, the contacts 4, 5 and 8 of the first level and contact 1 of the second level, and contacts 6 and 9 of the first level and contacts 2 and 4 of the second level, will accordingly be marked by ground potential. The one marked contact common to both levels being the contact 4, the wipers 171 and 172 will advance to this fourth contact thereby interrupting the out-pulsing after four open circuit impulses have been transmitted, all in a manner of operation identical to that described in detail for the transmission of the first digital impulses representing the digit "5." When the four digital impulses have been transmitted, the retranslate switch S170 is again restored and the storage disks 100W through 400Z are advanced another rotary position and the row of radial spokes 120 having magnetized thereon the coded pattern representing the digit "9" is now opposite the detection armatures of the read-out means in the manner described for the preceding digits. As indicated in Fig. 5, only the detection armature 310 will now be operated and marking ground will be extended only to the contacts 6 and 9 of the upper level of bank contacts of the switch S170 and to contacts 2 and 4 of the lower level. Since for the digits 7 through 9, and 0, only one detection armature will be operated, thereby extending marking ground only to the contacts 7 through 9, and 0 of the upper contact bank level, the contacts 7 through 9, and 0 of the lower contact bank level are permanently grounded to insure operation of relay R300 for these digits. The retranslate switch S170 will now advance to the ninth contact before both of the wipers 171 and 172 encounter marking ground potential on the same contacts and the pulse-out relays will cooperate to control the transmission of nine digital impulses corresponding to the digit "9" originally registered and recorded in the manner described in connection with the preceding digits.

The digital impulses corresponding to the remaining digits of the seven digit number symbolized in Fig. 5 are transmitted after having been read-out and retranslated in an identical manner of operation described for the preceding digits. After each digit has been read-out of the storage disks and the impulses corresponding thereto have been transmitted each digit represented on the spokes 120 of the disks is also erased in a manner as previously described.

It is necessary that the start key KS be held operated just long enough to permit the motor magnet M160 to self-interruptedly step the storage disks 100W through 400Z to a position where the first row of radial spoke faces 120' having magnetized thereon a coded pattern of magnetizations appears opposite the detection armatures 110 through 410. At this time the start relay R400 is caused to operate as above described and control of the motor magnet M160 and the rotation of the storage disks is transferred to the pulse-out relay R900. During the rotation of the storage disks from one rotary position to another a point midway between each position is reached where none of the detection armatures 110 through 410 may be operated to close ground potential to the start relay R400 and the latter relay will restore, opening its contacts 403 at which point ground was supplied to operate the relay R100. To prevent the relay R100 from releasing during this transition from one rotary position of the storage disks to another, the relay R100 is of the slow-to-release type, thereby precluding the possibility of recording any digit during this transitional interval due to an inadvertent operation of one of the keys K1 through K0.

A correct key KC is provided, which key may be operated whenever an error has been made, or whenever it becomes necessary to reject the digits already registered and recorded before any of the corresponding digital impulses have been transmitted. The correct key KC may, however, be operated either before or after the operation of the start key KS which latter operation initiates the transmission of the digital impulses. When the key KC is operated, it completes, at its associated contacts C1 an obvious energizing circuit through the interrupter contacts 161 for the motor magnet M160. If the correct key KC is held operated, it is evident that the storage disks 100W through 400Z can be continuously rotated by the self-interrupted operation of the magnet M160. Also simultaneously at the contacts C2 of the key KC, ground is extended via the conductor 126 to operate the relay R100, which relay operates, as previously described, various associated contacts, among which contacts are those controlling the voltage polarity reversing circuits of the magnets 206 through 209 whereby the erasing function of the write-in means is accomplished in the manner previously described. Thus operation of the relay R100 disconnects battery at its contacts 102 from the common magnet conductor 127 and substitutes therefor at its contacts 114, ground which may be traced from the contacts 403 via the conductor 144, contacts 114, conductor 125, and the operated contacts C4 of the correct key KC. At its contacts 103, 105, 107, and 109, respectively, the relay R100 connects battery to the terminals of the magnets 206 through 209 where ground was originally applied by means of the operation of any of the keys K1 through K0. Thus, as the storage disks are continuously rotated the reverse magnetization pattern on any of the rows of radial spokes 120 are effectively erased and registration and recording can be begun anew.

An important feature of the present invention provides for the automatic initiation of the transmission of digital impulses in the event that the start key KS is not operated within a certain interval of time after the last digit of a series of digits has been registered and recorded. This automatic operation is accomplished by the addition of the automatic start relay R600 and its slave relay R700. Whenever a digit is registered by the operation of one of the keys K1 through K0 an energizing circuit for the relay R600 is completed from ground via the contacts of the operated key and certain of the contacts associated with the remaining keys K1 through K0 as more specifically described hereinbefore, the conductor 142, the unilateral conducting element 13, winding of the relay R600, and contact 401 to negative battery. The automatic start relay R600 operates and, at its contacts 602, closes an obvious locking circuit for itself from ground. The unilateral conducting element 13, which may be of the same type as the elements 10, 11, 12 and 14, is inserted in the above-traced energizing circuit to prevent the shunting of the winding of relay R600 from ground at the contacts 602 to battery at the contacts S1 when the registering key K1 through K0 is permitted to restore after a digit has been registered. The relay R600 also, at its contacts 601, completes an obvious energizing circuit for the slave relay R700. The slave relay R700, when it operates, completes at the contacts 701, an energizing circuit, for the motor magnet M160, which circuit may be traced from ground at the contacts 601, contacts 701, conductor 128, contacts 402, conductor 124, interrupter contacts 161 and the winding of the magnet M160 to battery. The operation of the invention from this point is identical to the operation resulting from the operation of the start key KS, which is self-evident when it is recalled that operation of the start key KS accomplished just this application of ground potential to the conductor 128 and, thereby, to the magnet M160.

The slave relay R700, however, is of the slow-to-operate type and will therefore not complete the above-traced energizing circuit for the motor magnet M160 until a predetermined interval of delay time has elapsed and then only if the start key KS has not previously been operated to complete this circuit. In case normal initiation of the impulse transmission has been accomplished by the operation of the start key KS the start relay R400 will be operated as previously described and, at its contacts 401, the relay R400 will disable the automatic start relay R600 and its slave relay R700.

Each of the motor magnets M150 and M160 is provided with a filter circuit comprising respectively the condenser C152 and resistance 153, and the condenser C162 and resistance 163 to prevent sparking during the stepping operation of the magnets.

When the last series of digital impulses corresponding to the last digit stored in the storage disks has been transmitted the impulse arresting relay R900 will operate over a circuit previously described and will complete energizing circuits for the motor magnets M150 and M160 and will terminate out-pulsing by bridging the pulse-out conductors 146 and 147 at its contacts 901 also as described herein. The motor magnet M160 will energize but without effect, the magnet M150 on the other hand will self-interruptedly and rapidly step the wipers 171 and 172 of the retranslate switch S170 to their normal home positions. Operation of the relay R900 will interrupt, at its contacts 904, the energizing circuit for the pulse-out relay R110 which relay after a short interval will restore, thereby restoring at the contacts 117, the normal bridge across the pulse-out conductors 146 and 147. Also at the contacts 115 a previous energizing circuit for the motor magnet M150 is interrupted to prevent any interference with the self-interrupted operation of the stepping magnet M150 by the periodic completion of this previous energizing circuit through the operation of the pulse-in relay R120.

As soon as the wipers 171 and 172 advance from their grounded contact positions, the relays R200 and R300 will restore thereby opening the previously described energizing circuit for the relay R800. This last relay restores and reprepares, at the contacts 801, a point in the pulsing control circuit to the relay R110, and, at the contacts 802, opens the energizing circuit for the impulse arresting relay R900. The relay R900 is, however, locked to ground at its contacts 902 and does not at this time restore. When the wipers 171 and 172 finally reach their normal home position the off-normal switches ON130 and ON140 restore thereby opening respectively the self-interrupting energizing circuit for the motor magnet M150 and the energizing circuit for the impulse arresting relay R900. This last relay after a short interval restores and simultaneously, at its contacts 901 and 904, respectively, opens the bridge across the pulse-out conductors 146 and 147 and recloses the energizing circuit for the relay R110 to which relay, it will be recalled, ground is still at this time extended from the contacts 403. Also simultaneously with the restoration of the contacts 901 and 904, ground at the contacts 906 is extended to the erasing circuit previously described. However, the contact springs of the relay R900 are so adjusted that the contacts 905 will restore before any of the other contacts, thereby opening the energizing circuit for the motor magnet M160 whereupon the disks 100W through 400Z will rotate one final position. At this time the remaining contacts of the relay R900 will restore including the contacts 906 whereby ground is connected to the previously described erasing circuit to erase the last of the coded magnetizations from the spokes 120. Although the early interrupting of the energizing circuit for the motor magnet M160 at the contacts 905 also interrupts the energizing circuit for the erase relay R500, this last relay being of the slow-to-release type will allow ample time for the erasing operation to be completed before it restores and opens the erasing circuit at its contacts 501.

When the disks 100W through 400Z are advanced one rotary position by the deenergization of the motor magnet M160 none of the armatures at this time will be attracted to any of the next row of radial spokes 120 since this row of spokes has no coded pattern of reverse magnetizations induced thereon. Accordingly, no ground will now be extended to the start relay R400 which relay restores and, at its contacts 403, interrupts the energizing circuit for the relays R110 and R100. Since the initiation of the operations resulting in the interruption of the energizing circuit for the relay R110 was begun at the restoration of the break first contacts 905 before the energizing circuit for the relay R110 was again completed at the contacts 904, the relay R110 will not have time to operate and in doing so transmit a possible false open circuit impulse on the pulse-out conductors 146 and 147. The relay R100 also restores and at its various contacts reprepares the energizing circuits for the magnets 206 through 209 and transfers control of the motor magnet M160 from the impulse arresting relay R900 to the keys K1 through K0. The various circuits and components of this invention have now been restored to normal and a new series of digits can be keyed in and recorded.

Another embodiment of the present invention showing a variation in the means whereby the magnets 206 through 209 may be selectively energized is shown schematically in Fig. 6. This embodiment includes circuit elements and components substantially similar to those described in connection with the preferred embodiment of Fig. 1 with the exception that for the arrangement of contact springs associated with the keys K1 through K0, in the alternate embodiment is substituted an arrangement of unilateral conducting elements. Since the operation of the alternate embodiment is identical to that described for the preferred embodiment after the magnets 206 through 209 have been selectively energized, the following description will be limited only to the variant method of so selectively energizing the said magnets. The circuit elements and details in the alternate embodiment of Fig. 6 have been designated by the same reference characters as assigned in the preferred embodiment wherever the elements are identical.

If the digit "5" is to be registered and stored in the embodiment according to Fig. 6, the key K5 is operated and energizing circuits are simultaneously completed, at the associated contacts 51′, for the motor magnet M160 and the magnets 207 and 209. The circuit for the magnet M160 may be traced from ground via the conductor 130′, contacts 51′ unilateral conducting element 50′, conductor 142, contacts 113 and the winding of the magnet M160 to battery. The circuits for the magnets 207 and 209 may be traced from ground via the conductor 130′, contacts 51′ and, respectively, the unilateral conducting elements 55′ and 56′, contacts 106 and 111, conductors 152 and 154, the windings of the magnets 207 and 209, the common conductor 127, and contacts 102 to battery. Magnets 207 and 209 are in this manner energized to induce a flux in their respective pole-pieces H200 and H400 whereby a pattern of magnetization of a particular polarity is induced in the row of radial spokes 120 momentarily opposite the pole-pieces in the manner previously described. When the key K5 is released the energizing circuit for the magnet M160 will be interrupted and the disks 100W through 400Z will be caused to advance one rotary position also in the manner described previously herein to advance the next succeeding row of spoke faces 120′ opposite the pole-pieces H100 through H400.

The next digit "4" will be registered in a manner similar to that described for the digit "5," that is, the key K4 is operated whereby the energizing circuit for the motor magnet M160 will be completed from ground via the conductor 130′, contacts 41′, the unilateral conducting element 40′, the conductor 142, contacts 113 and the winding of the magnet M160 to battery. The write-in energizing circuits will, in the case of the digit "4," be simultaneously completed from ground via the conductor 130′, contacts 41′, and respectively, the unilateral conducting elements 45′ and 46′, contacts 106 and 108, conductors 152 and 153, the windings of the magnets 207 and 208, the common conductor 127, and the contacts 102 to battery. The digit "9" is similarly registered with the operation of the key K9 whereby energizing circuits are simultaneously completed for the motor magnet M160 and the magnet 208 respectively through the contacts 91′ and the unilateral conducting element 90′, and the contacts 91′ and the unilateral conducting element 95′ as clearly shown in Fig. 6 of the drawings. The remaining digits of the illustrative directory number symbolically represented in Fig. 5 as magnetization patterns of successive radial spoke faces 120′ are registered in the same manner as the digits 5, 4 and 9, that is, by selectively completing the various energizing circuits for the appropriate magnets 206 through 209 of the write-in means.

The unilateral conducting elements referred to in the foregoing description of the alternate embodiment of this invention may conveniently be selenium rectifiers and are provided to effectively isolate each of the energizing circuits for the magnets 206 through 209 from each other as these energizing circuits are completed by the operation of any of the keys K1 through K0 through the associated contacts 11′ through 01′, respectively.

The read-out operation with the subsequent transmission of the required impulses on the pulse-out conductors 146 and 147 as a result of the operation of the start key KS is identical to those operations as described in connection with the preferred embodiment and will therefore not again be described. The automatic start and correct features are also provided in the alternate embodiment with operations also identical to the operations of those features in the preferred embodiment. Finally, after all of the desired impulses have been transmitted in accordance with the digits registered and recorded in the memory, and the disks 100W through 400Z have been advanced to a rotary position at which no magnetizing pattern appears on the row of radial spoke faces 120′ opposite the armatures 110 through 410 of the read-out means, the restoration operation is initiated and completed in the manner identical to those operations as also described in connection with the preferred embodiment.

Although two means by which the operation of the keys K1 through K0 are effective to selectively energize the write-in heads to thereby register digits in my memory device have been shown, it is to be understood that the circuit arrangements shown can be adapted to permit other means for registering digits to be employed with the memory and impulse transmitting circuits. Thus by applying intermediate circuitry well-known in the telephone art, registration of digits and their storage in the form of coded magnetizations can be distantly accomplished by the operation of the well-known telephone subscriber station handset and dial. Digital impulses are then introduced into the arrangement by the operation of the dial and these impulses are translated into the proper coded magnetizations in the memory. Such a well-known circuit for selectively energizing a plurality of write-in heads is shown in the copending application of Edward S. Peterson, Ser. No. 395,559, filed December 1, 1953, now Patent No. 2,798,212, dated July 2, 1957.

While what has been described is considered to be the preferred and an alternative embodiment of the present invention, it is further to be understood that modifications may be made in the described circuit arrangements and organization of the elements without thereby departing from the scope of the appended claims.

What is claimed is:

1. In a digital impulse transmitter, a magnetic storage medium, write-in means comprising a plurality of heads, a source of potential, means for selectively connecting said source of potential to particular ones of said heads to energize said heads in a predetermined sense to cause magnetizations in a certain combination of one and the other polarity to be recorded in said storage medium, said polarity combination being representative of the number of decimal digital impulses to be transmitted, an output circuit for transmitting said impulses, a plurality of armatures, a permanent magnet depending from each of said armatures so as to be located in close proximity with said storage medium, means for causing a relative movement between said armatures and said storage medium to thereby cause alignment of said magnets with said magnetizations whereupon said magnetizations cause the corresponding magnets to be attracted and the corresponding armatures to be operated in accordance with said polarity combinations, means for initiating the transmission of impulses in said output circuit operated responsive to the operation of any of said armatures, an impulse counter, said counter operated coincident with the transmission of said impulses in said output circuit to count said impulses transmitted, means for indexing said counter to count the number of impulses to be transmitted, said indexing means operated responsive to and in accordance with the particular ones of said armatures operated, means for arresting the transmission of impulses in said output circuit, said arresting means operated by the operation of said counter whereby only the number of impulses represented by said polarity combination of magnetizations is transmitted.

2. In a digital impulse transmitter, a rotatable magnetic storage element, write-in means comprising a plurality of heads, each of said heads having an energizing coil, a source of potential of one polarity, means for selectively connecting said source of potential to particular ones of said coils to energize said heads in a predetermined sense and thereby cause magnetizations in a certain combination of one and the other polarity to be recorded in said storage element, said polarity combination being representative of the number of decimal digital impulses to be transmitted, an output circuit associated with said source for transmitting said impulses, read-out means comprising a plurality of armatures, a permanent magnet secured to each of said armatures, means for rotating said storage element to align said magnetizations into association with said magnets, said magnetizations being effective to attract the magnets aligned therewith, and thereby operate the corresponding armatures, in accordance with said polarity combination, means for initiating the transmission of said impulses on said output circuit, said initiating means operated responsive to the operation of any of said armatures, an impulse counter, said counter operated in accordance with the transmission of said impulses in said output circuit to count said impulses transmitted, means for indexing said counter in accordance with the number of impulses to be transmitted, said indexing means operated responsive to and in accordance with the particular ones of said armatures operated, means for arresting the transmission of impulses in said output circuit, said arresting means operated upon the operation of said counter whereby only the number of impulses represented by said polarity combination of magnetizations is transmitted, means operated responsive to the operation of said arresting means to operate said rotating means to thereby rotate said storage element to align such magnetizations into association with said write-in means, and means for reversing the polarity of the potential applied to said coils to cause said heads to be energized in the opposite sense whereby said polarity combination of magnetizations is erased from said storage element.

3. In a digital impulsing arrangement, a magnetic storage medium, write-in means comprising a plurality of heads, a source of potential, keying means for selectively connecting said source of potential to said heads to energize said heads in a predetermined sense, said keying means manually operable to cause magnetizations in a certain combination of one and the other polarity to be recorded in said storage medium by said heads, said polarity combination being representative of the number of decimal digital impulses to be transmitted, read-out means comprising a plurality of armatures individually operable responsive to said magnetizations, a pulsing circuit, a stepping switch having wipers and an associated contact bank, an operating magnet for stepping said wipers, means operated responsive to the operation of particular ones of said armatures in response to said polarity combination of magnetizations in said storage medium to mark particular contacts of said contact bank, means operated responsive to the operation of any one of said armatures for causing the transmission of decimal digital impulses over said pulsing circuit and for causing operation of said operating magnet to step said wipers also in accordance with said impulses, and means for arresting the transmission of impulses over said pulsing circuit, said arresting means operated responsive to said wipers engaging said marked contacts.

4. In a digital impulsing arrangement, a rotary magnetic storage element, a plurality of write-in heads associated with said storage element, a source of potential of one polarity, a plurality of keying means for registering decimal digits in said impulsing arrangement, means operated responsive to the operation of a selected one of said keying means to connect said source to said heads to energize particular ones of said heads in a predetermined sense to thereby cause magnetizations in a certain combination of one and the other polarity to be recorded in said storage element, said combination being representative of the particular digit registered by the operation of said selected keying means, a plurality of armatures, rotating means operated upon the recording of said polarity combination of magnetizations in said storage element to rotate said element to bring said magnetizations into association with said armatures, particular ones of said armatures operated responsive to said polarity combination of said magnetizations, a switch having wipers and a contact bank associated therewith, an operating magnet for said switch, an impulsing circuit, generating means for producing a continuous series of input impulses, means operated responsive to the operation of said particular ones of said armatures to mark particular contacts of said contact bank in accordance with said digit registered, means operated responsive to the operation of any one of said armatures to operatively associate said generating means with said impulsing circuit whereby said impulsing circuit is periodically energized in accordance with said input impulses to thereby transmit a series of output impulses, and to operatively associate said generating means with said operating magnet whereby said magnet is periodically energized to step said wipers also in accordance with said input impulses, disconnecting means for disassociating said generating means from said impulsing circuit, said disconnecting means operated responsive to said wipers engaging said marked contacts to interrupt said periodic energization of said impulsing circuit whereby said series of output impulses is controlled by said polarity combinations of said magnetizations recorded in said storage element.

5. In a digital impulsing arrangement as claimed in claim 4, including a second source of potential of another polarity, a second connecting means for connecting said second source of polarity to said heads, said rotating means also operated responsive to said operation of said disconnecting means to rotate said polarity combination of said magnetizations into association with said heads, said second connecting means also operated responsive to said operation of said disconnecting means to energize said heads in the opposite sense whereby said polarity combinations of said magnetizations are effectively erased from said storage element.

6. In a digital impulsing arrangement, a storage element, a plurality of heads associated with said element, said element rotatable to present successive rows of magnetizable areas opposite said plurality of heads, means for selectively energizing said heads in a predetermined sense to cause magnetizations in a certain combination of one and the other plurality to be recorded in said areas, registering means operated sequentially to register a series of decimal digits in said arrangement, means for rotating said element, said energizing means selectively operated responsive to said sequential operation of said registering means to cause said heads to induce successive polarity combinations of said magnetizations in said rows of areas as said element is rotated, each of said polarity combinations of said magnetizations being representative of a particular digit registered in accordance with a predetermined code, a plurality of armatures associated with said element, a permanent magnet secured to each of said armatures, said armatures operated in combinations responsive to said polarity combinations of said magnetizations in said rows of areas to attract the corresponding ones of said magnets as said element is rotated, impulse generating means, means for initiating the operation of said generating means whereby the production of impulses is initiated, said initiating means successively operated responsive to the successive operation of any of said armatures as said element is rotated, means for arresting the operation of said generating means, and means for successively operating said arresting means, said operating means successively operated responsive to the particular combinations of said armatures successively operated responsive to said polarity combinations of said magnetizations in said rows of areas as said element is rotated to cause said generating means to produce a series of groups of impulses corresponding to said series of digits registered.

7. In a digital impulsing arrangement as claimed in claim 6, a second means for energizing said heads in the opposite sense, said second energizing means operated to wipe out the polarity combinations of said magnetizations after the production of each group of impules corresponding to the said polarity combination of said magnetizations is arrested.

8. In a digital impulse transmitter, a magnetic storage means, means for rotating said storage means through successive rotary positions, a plurality of write-in heads, said storage means presenting successive rows of magnetizable areas opposite said plurality of heads as said storage means is rotated through said successive rotary positions, first means for selectively energizing said heads in a predetermined sense, second means for energizing said heads in the opposite sense, means for registering decimal digits in said transmitter, said first energizing means successively operated responsive to the registration of particular digits in said transmitter to energize particular ones of said heads to thereby successively cause magnetizations in certain combinations of one and the other polarity to be recorded in said rows of areas as said storage means is rotated through said successive rotary positions, said polarity combinations of magnetizations in said successive rows of areas corresponding respectively to said digits registered in accordance with a predetermined code, a plurality of armatures, means for operating said rotating means to rotate said rows of areas successively opposite said plurality of armatures, said armatures operable in accordance with the polarity combinations of magnetizations recorded in said rows of areas, as said storage means is rotated through said successive rotary positions, an output circuit for transmitting impulses, means for controlling the transmission of impulses on said output circuit, a counting switch having wipers and a contact bank for said wipers, a magnet, means operated responsive to the operation of any of said armatures, at each successive rotary position of said storage means, to operate said control means to initiate said transmission of impulses on said output circuit, said magnet operated in accordance with said transmitted impulses to step said wipers, means operated responsive to the operation of said armatures at each successive rotary position of said storage means to mark particular contacts of said contact bank, means operated when said wipers engage said marked contacts to cause said control means to interrupt said transmission of impulses on said output circuit, the number of impulses transmitted for each successive rotary position of said storage means thereby controlled in accordance with said polarity combinations of magnetizations in said successive rows of areas, means for operating said second energizing means each time said rows of areas are re-presented opposite said plurality of heads as said storage means is rotated through said successive positions, said heads thereby energized in the opposite sense whereby said polarity combinations of said magnetizations are effectively erased.

9. In a digital impulse transmitter as claimed in claim 8, a second means for operating said rotating means, means operated after a predetermined interval to operate said second means to rotate said rows of areas successively opposite said plurality of armatures, said alternate means disabled responsive to prior operation of said first means for operating said rotating means.

10. In a digital impulse transmitter as claimed in claim 8, including additional means for manually operating said second energizing means, and a third means for operating said rotating means, said third means operated responsive to the operation of said additional means to rotate said storage means, said additional means operable before said transmission of said impulses in said output circuit to energize said heads to thereby effectively erase said polarity combinations of said magnetizations as said storage means is rotated through said successive positions.

11. In a digital impulse transmitter as claimed in claim 8, said storage means comprising a plurality of corotatable elements, each of said elements having a plurality of radial spokes, said plurality of write-in heads individually associated with said plurality of corotatable elements such that said radial spokes of each of said elements present successive rows of magnetizable areas opposite said plurality of heads as said storage means is rotated through said successive rotary positions, said plurality of armatures also individually associated with said plurality of corotatable elements, said armatures successively operable in accordance with said polarity combinations of magnetizations recorded in said areas of said spokes of respective ones of said corotatable elements, as said storage means is rotated through said successive positions.

12. A memory device for storing a decimal digit in the form of a combinational code, said device comprising a movable magnetic storage medium having a plurality of discrete storage elements, a plurality of write-in heads associated with said said elements, means for selectively energizing said heads so as to cause magnetizations of one polarity to be recorded in certain ones of said elements, magnetizations of the opposite polarity being recorded in others, the corresponding polarity combination of said magnetizations representing a decimal digit, a plurality of read-out armatures associated with said elements, said armatures mechanically operable responsive to magnetizations in said elements of one polarity only, and means for moving said storage medium to bring said elements into association with said armatures to thereby operate the combination of armatures corresponding to said polarity combination of magnetizations in said elements.

13. A memory device for storing a plurality of decimal digits in the form of a combinational code, said device comprising a plurality of corotatable disks, each of said disks having a plurality of radial spokes, a plurality of write-in heads individually associated with said plurality of disks, means for selectively energizing said heads so as to cause magnetizations of one polarity to be recorded in certain ones of said spokes, magnetization of the opposite polarity being recorded in others, the corresponding polarity combination of said magnetizations representing a decimal digit, a plurality of read-out means mechanically operable responsive to magnetizations of one polarity only and means for rotating said disks to bring said spokes into association with said read-out means to thereby operate the particular combination of said read-out means corresponding to said polarity combination of magnetizations in said spokes.

14. A memory device for storing a decimal digit in the form of a combinational code, said device comprising a plurality of corotatable disks, each of said disks having a plurality of radial spokes, said spokes of each of said disks arranged in rows with said spokes of others of said disks, a plurality of write-in heads individually associated with said disks, means for rotating said disks to present one of said rows of spokes opposite said heads, means for selectively energizing said heads so as to cause magnetizations of one polarity to be recorded in certain ones of said spokes of said row of spokes, magnetizations of the opposite polarity being recorded in other spokes of said row, the corresponding polarity combination of said magnetizations representing a decimal digit, a plurality of read-out armatures individually associated with said disks and mechanically operable responsive to magnetizations in said spokes of one polarity only, said first means operated to again rotate said disks to present the said one of said rows of spokes opposite said armatures, thereby to operate the combination of armatures corresponding to said polarity combination of magnetizations in the spokes of the said one row of spokes.

15. A memory device as claimed in claim 14, in which each of said radial spokes of said disks has a magnetization of said opposite polarity normally recorded therein, said armatures normally repelled by the last-mentioned spokes.

16. A memory device as claimed in claim 15, in which said first means is again operated to rotate said disks to present said one of said rows of spokes again opposite said heads, and means for energizing said heads to induce a magnetic flux of said oppoiste polarity in said spokes of said one row of spokes to thereby restore said spokes of said one row to their normal magnetic condition.

17. A digital memory device comprising a rotatable storage means, said storage means comprising successive rows of radial elements normally magnetized at one polarity, a plurality of write-in heads associated with said storage means, means for rotating said storage means, said write-in heads energizable to induce a magnetic flux of either polarity in said rows of elements as said storage means is rotated, a first means for periodically and selectively energizing said plurality of write-in heads to induce a magnetic flux of a polarity opposite to said normal polarity in particular elements of successive rows of elements as said storage means is rotated, each of the polarity combinations of magnetizations thus recorded in said rows being representative of a predetermined digit, a plurality of detection means associated with said storage means, said detection means mechanically operative responsive to the tractive influence of said magnetic flux of said opposite polarity only, said storage means further rotated to bring said rows of elements successively into association with said plurality of detection means, said detection means periodically and selectively operated responsive to said magnetic flux of said opposite polarity only in said particular elements of successive rows of elements as said storage means is rotated, the particular combinations of said detection means operated corresponding to said predetermined digits, a second means for periodically energizing said plurality of write-in heads to induce a magnetic flux of said normal polarity in said elements, said second means operated responsive to each successive operation of said plurality of detection means to restore said particular elements of said rows of elements to said normal polarity.

18. A digital memory device as claimed in claim 17, in which said plurality of detection means comprises a plurality of contacting means having a plurality of permanently magnetized members associated therewith, said members magnetized such that the said normal polarity of said radial elements repels said members to maintain said contacting means in a normal position and that only said induced opposite polarity of said radial elements attracts said members to operate said contacting means.

19. In a memory device, for storing a plurality of decimal digits in the form of a combinational code, a series of groups of magnetizable elements, a series of magnetizing units, means for causing relative movement between said elements and said units in such a manner as to bring said groups of elements successively into alignment with said series of units, means for energizing certain of said units when in alignment with a group of elements to thereby cause magnetization of a particular polarity in certain of the elements in a group, magnetizations of the opposite polarity being recorded in other elements of said group, the corresponding polarity combination of magnetizations representing a decimal digit, a series of switches having permanent magnets secured thereto said first means also operative to bring said groups of elements successively into alignment with said magnets whereupon said magnetized elements of said particular polarity only in said group of elements attract said magnets and operate a certain number of said switches dependent upon the elements of the group which were magnetized in such particular polarity by said units.

20. A memory device, for storing a plurality of digits in the form of a combinational code comprising a plurality of rotatable disks, each disk having a plurality of radial spokes, a plurality of magnetizing heads, each one of said heads individually aligned with a corresponding one of said disks and with successive ones of the spokes in said corresponding disk at successive rotary positions thereof, means for energizing certain of said heads to thereby magnetize the respective ones of the spokes in alignment therewith in a particular polarity, magnetizations of the opposite polarity being recorded in the other spokes which are aligned with the heads in the respective rotary position, the corresponding polarity combinations of magnetizations representing a decimal digit, a ring of magnetic material surrounding said disks, the magnetic circuit for magnetizing each spoke including a magnet core, the particular spoke, and the ring, a series of magnetically pre-polarized contact making elements arranged to be aligned with said spokes, certain of said elements moved by the magnetic attraction between said respective spokes and said elements, the magnetic circuit for moving said elements also including said magnetized spoke and said ring.

21. A device as claimed in claim 20 in which there are a pair of slots in said ring, and in which the ends of said heads are inserted in one slot adjacent the spokes, and in which the elements are inserted in the other slot also adjacent the spokes.

22. In an impulse transmitter, a storage medium, a plurality of storage units in said medium, a plurality of storage elements in each of said units, said elements being arranged in rows wherein each row includes one of the elements in each unit, a plurality of write-in heads individually associated with said units, means for rotating said units through successive rotary positions to thereby align a different one of said rows of elements with said heads at each of said positions, means for selectively energizing said heads at each of said positions to thereby induce magnetizations of a particular polarity on the respective elements in each of said rows, magnetizations of the opposite polarity being recorded in the other elements of each row, the corresponding polarity combination of magnetizations in each row representing a predetermined digital code, whereby a group of decimal digits is registered in said medium, a plurality of prepolarized read-out heads individually associated with said units and arranged to be aligned with a different one of said rows of elements at each of said positions, the magnetizations of said particular polarity in each of said rows of elements effective when said heads are aligned therewith to operate the corresponding heads, and means operated responsive to operation of said read-out heads as said rows of elements magnetized in accordance with said polarity combinations of magnetizations are rotated into alignment with said read-out heads for transmitting successive series of digital impulses corresponding to said groups of digits.

23. In an impulse transmitter as claimed in claim 22, wherein each of said read-out heads comprises an armature with a permanent magnet secured thereto, said operation of said read-out heads consisting of the movement of said armatures when said magnets are attracted to said magnetizations of said particular polarity.

24. In an impulse transmitter as claimed in claim 23, wherein said storage elements are semi-permanent magnets that are normally conditioned to present a magnetic flux of a polarity opposite to said particular polarity adjacent to said heads as said units are rotated, and wherein said magnetizations of said particular polarity reversal of said normal polarity so that said magnetized elements thereafter present a magnetic flux of said particular polarity adjacent to said heads as said units are rotated.

25. In an impulse transmitter as claimed in claim 24, wherein said permanent magnets are conditioned to present a magnetic flux of said normal polarity adjacent to said elements, said magnets being repelled by said elements magnetized in said normal polarity and attracted by said elements magnetized in said particular polarity.

26. In an impulse transmitter of the class wherein a series of decimal digits are stored in a rotatable storage medium as a corresponding series of groups of magnetizations, and a pulsing and pulse-counting means is effective to transmit a series of groups of impulses corresponding to said series of digits, the combination with said storage medium of a plurality of armatures each having permanent magnets depending therefrom, said magnetizations in each of said groups of magnetizations being in selected combinations of one and the other polarity, the magnetizations of one polarity only being effective when rotated into alignment with said armatures to attract the corresponding ones of said magnets and thereby move the coresponding armatures, and means associated with said plurality of armatures effective when any one or more of said armatures is moved to simultaneously initiate the transmitting of said impulses and mark said counting means, said marking effective to cause termination of said impulse transmission after each of said groups of impulses has been transmitted.

References Cited in the file of this patent

UNITED STATES PATENTS

| | | |
|---|---|---|
| 2,042,869 | Smith | June 2, 1936 |
| 2,080,100 | Touschek | May 11, 1939 |
| 2,310,138 | Whittaker | Feb. 2, 1943 |
| 2,412,625 | Mallina | Dec. 17, 1946 |
| 2,750,579 | Lepas | June 12, 1956 |
| 2,770,796 | Boer | Nov. 13, 1956 |
| 2,802,201 | Casagrande | Aug. 16, 1957 |